United States Patent
Feng et al.

(10) Patent No.: US 11,512,007 B2
(45) Date of Patent: Nov. 29, 2022

(54) PROCESS FOR PREPARING RODLIKE MAGNETIIC FERROFERRIC OXIDE MATERIAL AND USE THEREOF

(71) Applicant: Harbin Institute Of Technology, Shenzhen, Shenzhen (CN)

(72) Inventors: Huanhuan Feng, Shenzhen (CN); Yuhuan Liu, Shenzhen (CN); Xing Ma, Shenzhen (CN); Tingting Zheng, Shenzhen (CN); Weiwei Zhao, Shenzhen (CN); Jiaheng Zhang, Shenzhen (CN)

(73) Assignee: Harbin Institute Of Technology, Shenzhen (CN)

( * ) Notice: Subject to any disclaimer, the term of this patent is extended or adjusted under 35 U.S.C. 154(b) by 398 days.

(21) Appl. No.: 16/734,970

(22) Filed: Jan. 6, 2020

(65) Prior Publication Data

US 2020/0216328 A1 Jul. 9, 2020

(30) Foreign Application Priority Data

Jan. 4, 2019 (CN) .......................... 201910008668.3

(51) Int. Cl.
  *C01G 49/08* (2006.01)
  *C01G 49/00* (2006.01)
  (Continued)

(52) U.S. Cl.
  CPC .......... *C01G 49/08* (2013.01); *C01G 49/0018* (2013.01); *H01F 1/0063* (2013.01);
  (Continued)

(58) Field of Classification Search
  CPC ..... H01F 1/0081; H01F 1/0063; C01G 49/08; C01P 2004/84; C01P 2004/62; C01P 2004/16; C01P 2006/42
  See application file for complete search history.

(56) References Cited

U.S. PATENT DOCUMENTS 9,180,484 B2 * 11/2015 Yin .................. B05D 3/207

FOREIGN PATENT DOCUMENTS

| CN | 102381729 | * | 3/2012 |
| CN | 10484371 | * | 8/2015 |

OTHER PUBLICATIONS

Translation for CN 102381729—Mar. 21, 2012.*
Translation for CN 104843715—Aug. 19, 2015.*

* cited by examiner

*Primary Examiner* — C Melissa Koslow
(74) *Attorney, Agent, or Firm* — Lerner, David, Littenberg, Krumholz & Mentlik, LLP

(57) ABSTRACT

The present invention relates to a process for preparing a rodlike magnetic ferroferric oxide ($Fe_3O_4$) material and use thereof. The preparation includes the following steps: step 1: magnetic Fe3O4 nanoparticle preparation; and step 2: self-assembly of magnetic Fe3O4@SiO2 nanoparticles into a rodlike magnetic material. When in use, the rodlike magnetic $Fe_3O_4$ material prepared by the process according to claim 1 is used in micro- and nano-motors, which can implement rotation and deflection in an external magnetic field. The present invention provides a process for preparing a rodlike magnetic $Fe_3O_4$ material. The rodlike magnetic ferroferric oxide material prepared by the process is suitable for mass production on an industrial scale, featuring identifiable direction of the magnetic moment, strong magnetism, good magnetic response, simple process, and low cost.

2 Claims, 5 Drawing Sheets
(5 of 5 Drawing Sheet(s) Filed in Color)

(51) Int. Cl.
*H01F 1/01* (2006.01)
*H01F 1/00* (2006.01)
(52) U.S. Cl.
CPC ............ *H01F 1/0081* (2013.01); *H01F 1/01* (2013.01); *C01P 2004/03* (2013.01); *C01P 2004/16* (2013.01); *C01P 2004/62* (2013.01); *C01P 2004/84* (2013.01); *C01P 2006/42* (2013.01)

FIGs. 3a to 3f a) SEM of $Fe_3O_4$. b) SEM of rod $Fe_3O_4@SiO_2$. c) SEM of rod SERS probe $Fe_3O_4@SiO_2@Ag$.
e)-i) SEM and EDS mapping of $Fe_3O_4@SiO_2@Ag$, f)-i) are Ag, O, Si, Fe.
Scale bars below are 200 nm.

PROCESS FOR PREPARING RODLIKE MAGNETIIC FERROFERRIC OXIDE MATERIAL AND USE THEREOF

CROSS REFERENCE TO RELATED APPLICATIONS

This application claims priority from Chinese application number 201910008668.3, filed Jan. 4, 2019, the disclosure of which is hereby incorporated herein by reference.

TECHNICAL FIELD

The present invention relates to the field of magnetic composites preparation, and in particular to a process for preparing a rodlike magnetic ferroferric oxide ($Fe_3O_4$) material and use thereof.

BACKGROUND

Structurally, existing magnetic ferroferric oxide ($Fe_3O_4$) available on the market is mainly a spherical particle. Spherical granular structure cannot make the best of and implement precise manipulation in magnetic field, because it is relatively simple and single and has no identifiable direction of the magnetic moment. For example, existing spherical granular magnetic materials may only implement such operations as motion and enrichment caused by magnetic attraction, instead of more precise, implementary and complex operations, such as magnetic orientation and rotation. This leads to low-end and seriously homogeneous application of magnetic materials, and greatly restricts the operability of magnetic materials under the action of magnetic response, making it difficult to realize large-scale, high-end, complex and widespread applications of a magnetron system in all fields.

SUMMARY

In view of defects or shortcomings existing in the prior art, the present invention provides a process for preparing a rodlike magnetic ferroferric oxide ($Fe_3O_4$) material. The rodlike magnetic $Fe_3O_4$ material prepared by the process is suitable for mass production on an industrial scale, featuring uniform particle size, excellent monodispersity, adjustable diameter, identifiable direction of the magnetic moment, strong magnetism, good magnetic response, simple process, and low cost.

To achieve the above objective, the present invention provides the following technical solution: a process for preparing a rodlike magnetic $Fe_3O_4$ material, including the following steps:

Step 1: preparation of magnetic $Fe_3O_4$ nanoparticles (1) Dissolving 0.675 g of $FeCl_3.6H_2O$ in 35 mL of ethylene glycol, and mixing to obtain solution A1;

(2) Adding 1.925 g of $CH_3COONH_4$ in solution A1, and stirring for 30 min to obtain solution A2; and (3) Charging solution A2 into a reactor, heating to 200° C., heating and reacting for 12 h at a constant temperature, cooling down to room temperature, centrifuging and washing 4-6 times, and drying in air at room temperature to obtain 200-400 nm $Fe_3O_4$ nanoparticles;

Step 2: preparation of a rodlike magnetic $Fe_3O_4@SiO_2$ nanoparticle material (1) Dissolving 4 mg of $Fe_3O_4$ obtained in step 1 in a mixture of 5 mL of deionized water and 25 mL of isopropanol, and sonicating for 30 min to obtain mixed solution B1;

(2) Adding 0.5 mL of ammonia water and 30 μL of tetraethyl orthosilicate (TEOS) into mixed solution B1 to initiate reaction, placing on a tube roller shaker, and reacting for 6 h at room temperature to obtain mixed solution B2;

(3) After reaction, filtering to obtain filter residues, and washing twice separately with ethanol and deionized water to obtain 250-400 nm rodlike magnetic $Fe_3O_4@SiO_2$ nanoparticles; storing the magnetic $Fe_3O_4@SiO_2$ nanoparticles in 30 mL of ethanol for use;

wherein a rodlike structure is formed based on the mechanism that a sub-stable structure formed by self-assembly of magnetic particles is cured to form a permanently fixed structure during $SiO_2$ shell coating.

Further, consumption of $FeCl_3.6H_2O$ may also be 0.81, 0.945, 1.08, 1.215, or 1.35 g.

Further, a diameter of the $Fe_3O_4$ nanoparticle is 200 to 400 nm.

Another objective of the present invention is to use the rodlike magnetic $Fe_3O_4$ material featuring identifiable direction of the magnetic moment, strong magnetism, and good magnetic response as a probe of micro- or nano-motor. This can implement complex magnetic manipulation, including deflection, direction change, and even rotation, in a magnetic field.

Beneficial effects of the present invention are as follows:

1. A one-dimensional rodlike magnetic $Fc_3O_4$ material is prepared and synthesized by the process provided by the present invention. Regulation of consumptions of $FeCl_3$, ethylene glycol, and isopropanol can effectively and controllably synthesize the one-dimensional rodlike magnetic material featuring identifiable direction of the magnetic moment, strong magnetism, and good magnetic response. For the one-dimensional rodlike magnetic material prepared, the direction of the magnetic moment is consistent with the rodlike one-dimensional direction, length is adjustable, and there are great application prospects and potentials.

2. Self-assembly property of the magnetic material is mainly used in the preparation of magnetic composite materials. Silica shell grows on the template of self-assembly of magnetic material to fix such structure. In view of the process, raw materials are cheap and readily available; cost is low; synthetic process is simple and efficient; product quality is stable with good reproducibility; it is easy to achieve mass production of the one-dimensional rodlike magnetic material; the one-dimensional rodlike magnetic material obtained is widely used in the field of micro-motor, with wide application prospects.

3. Complex magnetic manipulation, including deflection, direction change, and even rotation, can be implemented in a magnetic field. Self-assembly between magnetic particles achieves adjustable length in their one-dimensional direction; different length-diameter ratios can be achieved to meet the demands in different application scenarios; moreover, the synthetic preparation process has a potential for large-scale industrial production and achieves amplification of industrial production.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5A-1 shows a chart of the effect of diameter of $Fe_3O_4$ provided by the present invention on length of a rodlike magnetic motor, FIG. 5A-2 shows real-time time-sharing screenshots of diameters of $Fe_3O_4$ depicted in FIG. 5A-1 when the rodlike magnetic motor rotates;

DETAILED DESCRIPTION

The following describes the present invention in more detail below with reference to the accompanying drawings and specific implementation.

Embodiment 1

A process for preparing a rodlike magnetic ferroferric oxide ($Fe_3O_4$) material is described, including the following steps:

1. Preparation of Magnetic $Fe_3O_4$ Nanoparticles

Magnetic $Fe_3O_4$ nanoparticle preparation is used in the embodiment, and magnetic $Fe_3O_4$ nanoparticles are prepared by hydrothermal synthesis.

Detailed procedure is as follow: dissolve 0.675 g of $FeCl_3 \cdot 6H_2O$ in 35 mL of ethylene glycol, sonicate at 20 kHz, and mix them to obtain solution A1; then add 1.925 g of $CH_3COONH_4$ in the mixed solution A1, and stir for 30 min to obtain solution A2; charge solution A2 in a reactor, and heat for 12 h at 200° C. for complete reaction; cool down to room temperature, centrifuge and wash 4-6 times, and drying in air at room temperature to obtain 250-400 nm $Fe_3O_4$ nanoparticles.

2. Preparation of a One-Dimensional Rodlike Magnetic $Fe_3O_4$ Materials

Preparation of the one-dimensional rodlike magnetic $Fe_3O_4$ material in the embodiment refers to magnetic core-shell nanoparticle $Fe_3O_4@SiO_2$ preparation. $Fe_3O_4@SiO_2$ is prepared by sol-gel method.

Detailed procedure is as follow: dissolve 4 mg of $Fe_3O_4$ obtained in step 1 (by hydrothermal synthesis) in a mixture of 5 mL of deionized water and 25 mL of 100% isopropanol, and sonicate for 30 min to obtain mixed solution B1; add 0.5 mL of ammonia water and 30 μL of tetraethyl orthosilicate (TEOS) into mixed solution B1 to initiate reaction, place them on a tube roller shaker, and react for 6 h at room temperature to obtain mixed solution B2; after reaction, filter to obtain filter residues, and wash them twice separately with ethanol and deionized water to obtain 250-400 nm magnetic $Fe_3O_4@SiO_2$ nanoparticles; store the magnetic $Fe_3O_4@SiO_2$ nanoparticles in 30 mL of ethanol for use.

3. Preparation of a Rodlike Magnetic $Fe_3O_4@SiO_2$ Nano-Composites

Self-assembly property of magnetic material is mainly used in the embodiment, and silica shell grows on the template of self-assembly of magnetic material to fix to obtain a rodlike magnetic $Fe_3O_4@SiO_2$ nano-composite structure.

One-dimensional rodlike structure achieves identifiable magnetic moment of the magnetic material, greatly improves the application range and magnetic response mode of the magnetic material, and implements complex and precise magnetron motions, including rotation.

Experimental Verification:

1. Particle Size Characterization and Dispersion Verification of Magnetic Particles of Different Diameters:

Using the same method as Embodiment 1, six batches of 250-400 nm magnetic $Fe_3O_4$ nanoparticles were prepared with different weights (0.675, 0.81, 0.945, 1.08, 1.215, and 1.35 g) of $FeCl_3$. After completion of the preparation, FIGS. 1a to 1f were observed by scanning electron microscopy (SEM). As is apparent from FIGS. 1a to 1f, the process of the present invention can achieve the synthesis of magnetic particles of different diameters; moreover, particle size distribution is very uniform for magnetic particles prepared by the process of the present invention, further indicating that the particle size of the obtained $Fe_3O_4$ can be adjusted by changing the amount of $FeCl_3$; furthermore, particle size distribution is very good for $Fe_3O_4$ prepared under six conditions, as well as dispersion, without such phenomena as particle adhesion and agglomeration.

2. Verification of the Length Adjustability and the Magnetic Moment Identifiability Further, the one-dimensional rodlike magnetic $Fe_3O_4$ material prepared in Embodiment 1 (six batches were prepared with different amounts, respectively) was used and fixed by self-assembly of magnetic particles, so as to prepare six batches of different one-dimensional rodlike magnetic materials. FIGS. 3a to 3f show that the six batches prepared have quite a number of rodlike structures (scale: 5 μm). As is apparent from FIGS. 3a to 3f, content of one-dimensional rodlike structure decreases gradually as the diameter of magnetic particle shortens, indicative of adjustable length and good dispersion of the magnetic $Fe_3O_4$ material prepared by the process of the present invention. In a magnetic field, the rodlike material rotates and orientates with the direction of the magnetic field. This indicates that, with the one-dimensional rodlike structure, the present invention achieves the magnetic moment identifiability of the magnetic material, greatly improves the application range and magnetic response mode of the magnetic material, and is able to implement complex and precise magnetron motions, including rotation.

Figures 1A, 1B, 1C, 1D, 1E, 1F:
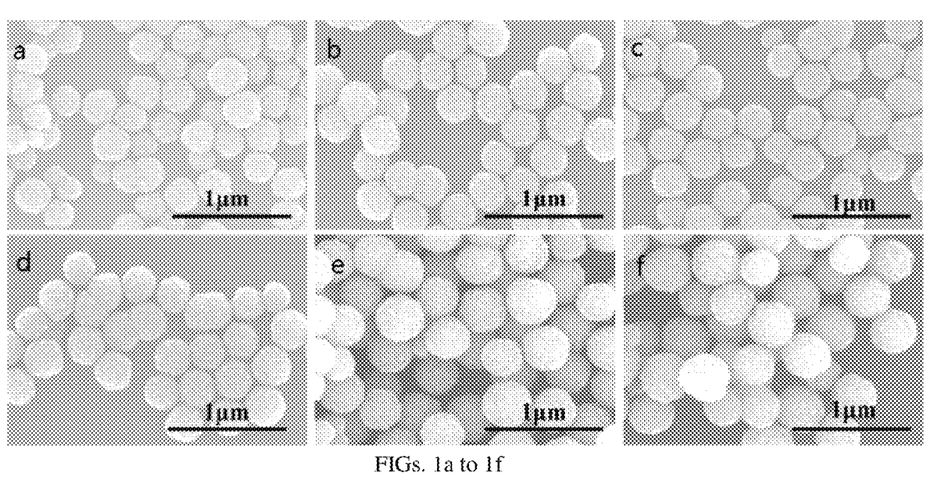
FIGS. 1a, 1b, 1c, 1d, 1e, and 1f show structural schematic views of six batches of $Fe_3O_4$ magnetic materials of different diameters prepared by the present invention, respectively.
Figure 2:
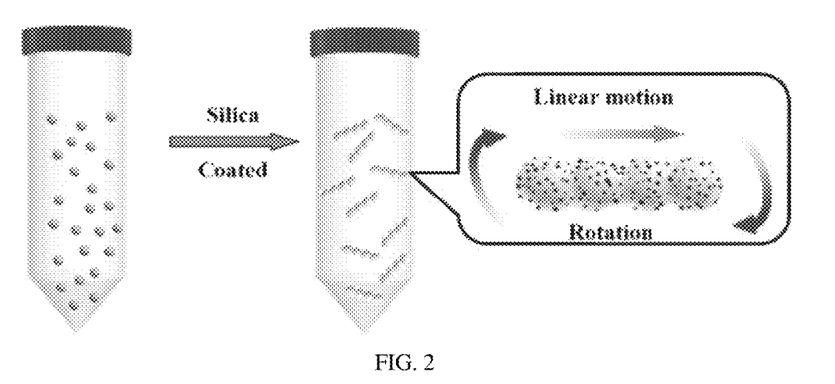
FIG. 2 shows a process diagram of a $Fe_3O_4@SiO_2$ magnetic material prepared by the present invention.
Figures 3A, 3B, 3C, 3D, 3E, 3F:
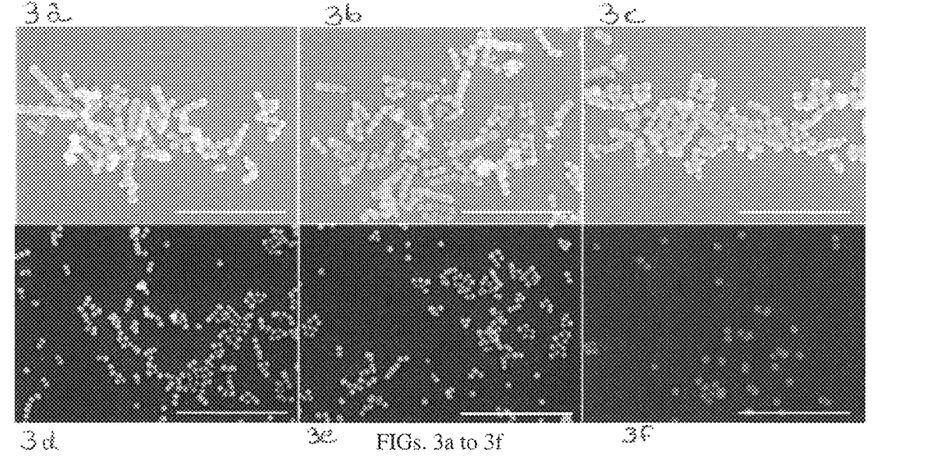
FIGS. 3a, 3b, 3c, 3d, 3e, and 3f show structural schematic views of six batches of $Fe_3O_4@SiO_2$ magnetic materials of different lengths prepared by the present invention, respectively.
Figures 4A, 4B, 4C, 4E, 4F, 4G, 4H, 4I:
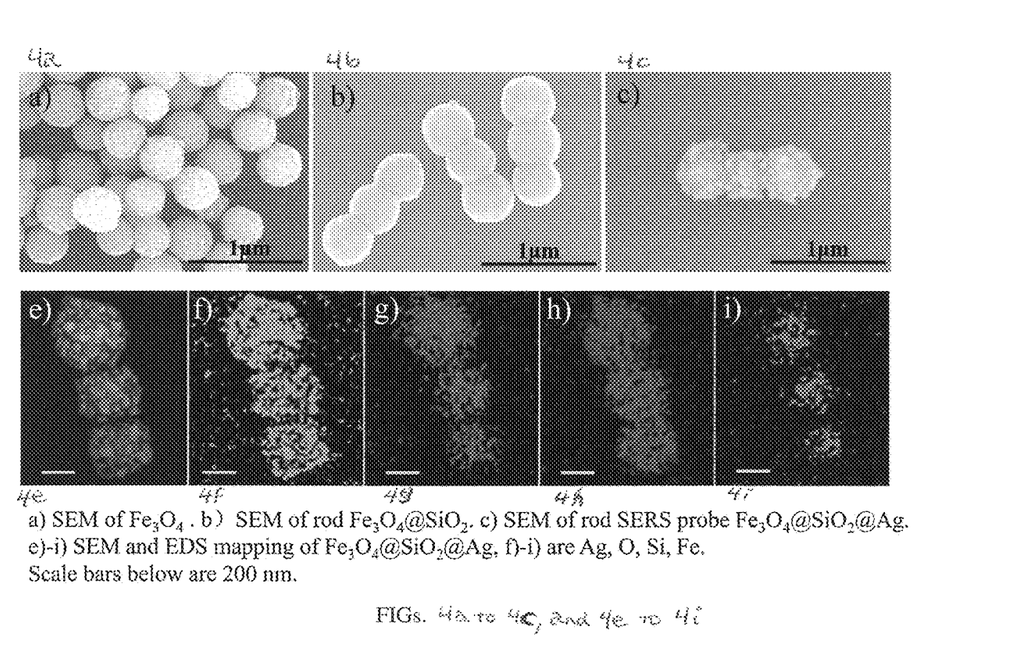
FIG. 4a shows an SEM image of magnetic $Fe_3O_4$ in Embodiment 1.
FIG. 4b shows an SEM image of $Fe_3O_4@SiO_2$ in Embodiment 1.
FIG. 4c shows an SEM image and an SERS spectrum of $Fe_3O_4@SiO_2@Ag$ in Embodiment 1.
FIGS. 4e, 4f, 4g, 4h and 4i show SEM images and EDS spectra of $Fe_3O_4@SiO_2@Ag$ in Embodiment 1.
Figure 5A:
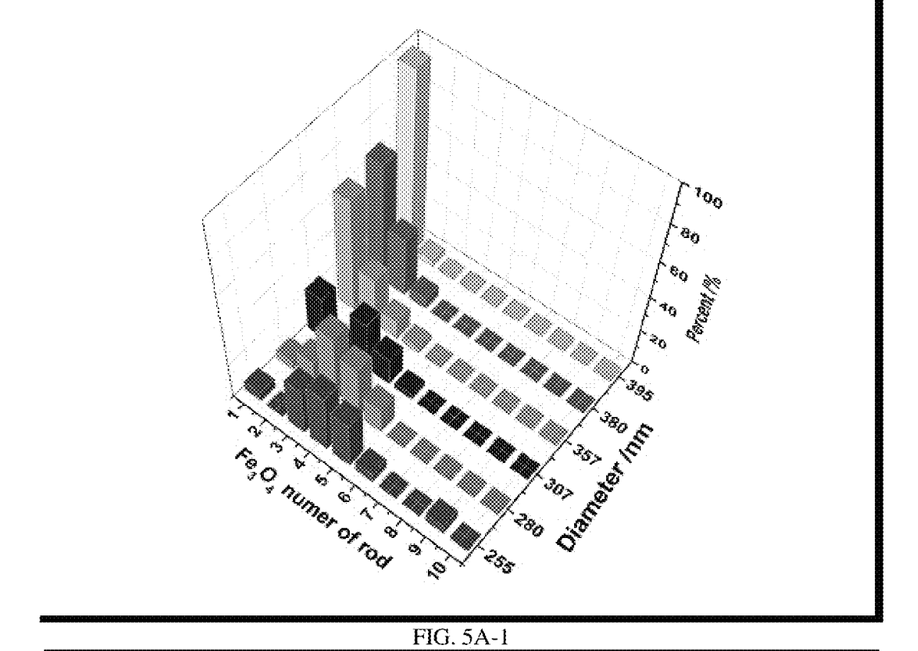
Figure 5A:
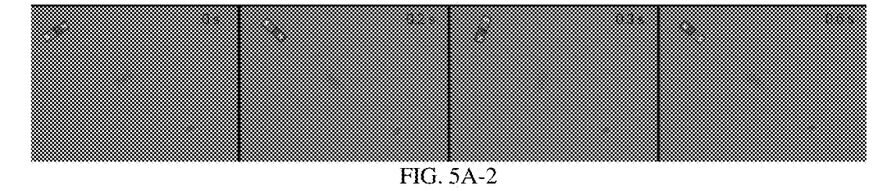

Further, a change law of percent content of one-dimensional rodlike structure versus diameter of magnetic particle was observed through six sets of experiments, and a chart of the effect of diameter of $Fe_3O_4$ on length of rodlike magnetic motor was obtained, as depicted in FIG. 5A-1 (each bar corresponding to each diameter in the figure represents the experimental data obtained by measuring the motor length after every single experiment). FIG. 5A-2, i.e., real-time time-sharing screenshots when the rodlike magnetic motor rotates, matches with the rotation data shown in FIG. 5A-1. As is apparent from FIG. 5A-1, as magnetic particles decrease, i.e., when particles are 250 nm in diameter, percent content of the one-dimensional rodlike structure is high, the length-diameter ratio of one-dimensional rodlike structure is also high, and the rodlike structure is long; in addition, as the diameter of magnetic particle increases to 400 nm, the percent content of rodlike structure decreases, the length-diameter ratio of rodlike structure reduces, and the rodlike structure becomes shorter and shorter and finally converts back into its original spherical structure. It can thus be seen that 200-400 nm particles prepared by the process of the present invention have adjustable diameters.

3. Verification of Use in Complex Magnetic Manipulation, Including Deflection, Direction Change, and Even Rotation, Another modification of the present invention is to use the rodlike magnetic $Fe_3O_4$ material in micro- and nano-motors, which can implement rotation and deflection in an external magnetic field. In particular, the rodlike magnetic $Fe_3O_4$ material prepared by the present invention, featuring identifiable direction of the magnetic moment, strong magnetism, and good magnetic response, is used as a probe of micro- or nano-motor. This can implement complex magnetic manipulation, including deflection, direction change, and even rotation, in a magnetic field. Verification is performed in detail in the following two sets of experiments:

(1) Deflection in the Magnetic Field

Experimental condition: The rodlike magnetic $Fe_3O_4@SiO_2$ nano-composite (also a one-dimensional rodlike magnetic material) prepared in Embodiment 1 was used.

Figure 5B:
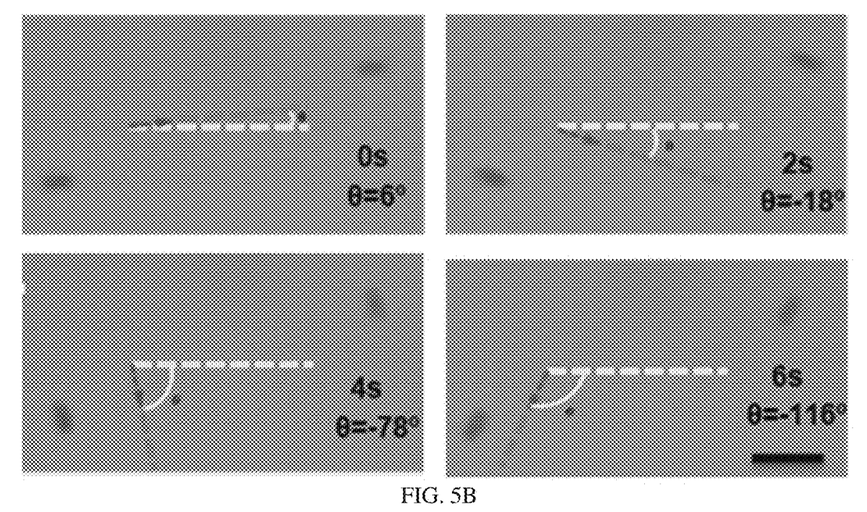
FIG. 5B shows schematic diagrams of how a one-dimensional rodlike magnetic material provided by the present invention changes its orientation and deflects in a magnetic field.

Experimental process: The one-dimensional rodlike magnetic material prepared by self-assembly of magnetic particles in Embodiment 1 was placed on a laboratory bench; its direction was deflected by changing the magnetic field direction in order to achieve the ability to adjust its orientation; photos were taken microscopically. Schematic diagrams of how the one-dimensional rodlike magnetic material changes its orientation and deflects (clockwise) in a magnetic field, i.e., deflection angles at 0, 2, 4, and 6 s (action time of the magnetic field), respectively, as shown in FIG. 5B. In FIG. 5B, there are two pieces of one-dimensional rodlike magnetic material, both of which change their directions of orientation with the direction of the magnetic field in a 90 gauss magnetic field; microscopically, when expressed by phase coordinates at 0, 2, 4, and 6 s, deflection angles are 6°, −18°, −78°, and −116°, respectively, fully demonstrating that the material has a visible one-dimensional direction of the magnetic moment.

(2) Rotation in the Magnetic Field

Figure 6A:
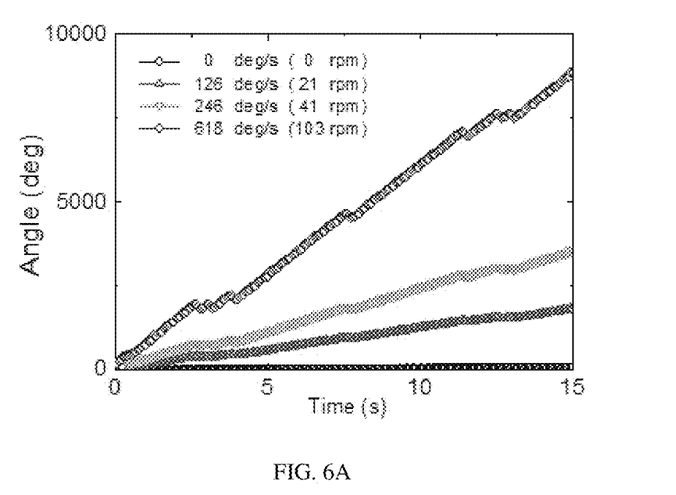
FIG. 6A shows a plot of curves of a one-dimensional rodlike magnetic material provided by the present invention rotating in a constant-speed rotating magnetic field.
Figure 6B:
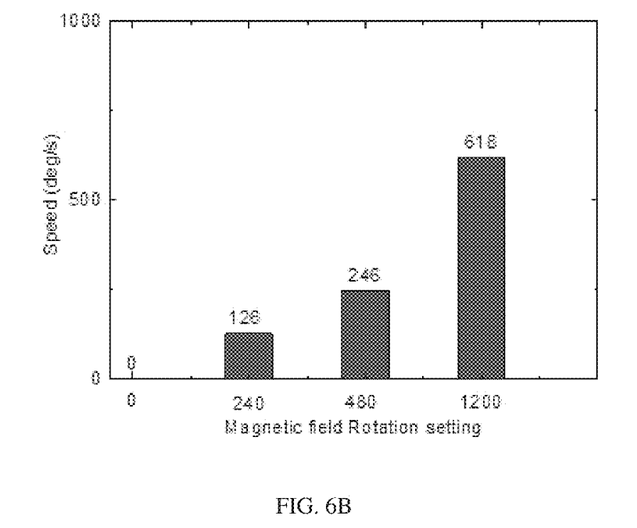
FIG. 6B shows a bar chart of the one-dimensional rodlike magnetic material provided by the present invention rotating in a constant-speed rotating magnetic field.

The one-dimensional rodlike magnetic material was further placed in a constant-speed rotating magnetic field to test its constant-speed rotating performance. Results are shown in FIGS. 6A and 6B. Three kinds of rotational speed were selected for testing: 0, 21, 41, and 103 rpm, respectively. The rotational speed was recorded using a video software and was plotted versus time. It can be seen that the one-dimensional rodlike magnetic material shows a good rotating performance in a 90 gauss magnetic field when rotating at 40 to 200 RPM. without loss of synchronism.

The foregoing is a further detailed description of the present invention in connection with specific preferred embodiments, and it is not to be determined that the specific implementation of the present invention is limited to these illustrations. It will be apparent to those skilled in the art that certain modifications and substitutions may be made without departing from the spirit of the invention, and all such modifications and variations are intended to be within the scope of the appended claims.

What is claimed is:

1. A process for preparing a rodlike magnetic ferroferric oxide ($Fe_3O_4$) material, comprising the following steps:

Step 1: preparation of magnetic $Fe_3O_4$ nanoparticles
(1) Dissolving 0.675 g of $FeCl_3.6H_2O$ in 35 mL of ethylene glycol, and mixing to obtain solution A1;
(2) Adding 1.925 g of $CH_3COONH_4$ in solution A1, and stirring for 30 min to obtain solution A2; and
(3) Charging solution A2 into a reactor, heating to 200° C., heating and reacting for 12 h at a constant temperature, cooling down to room temperature, centrifuging and washing 4-6 times, and drying in air at room temperature to obtain $Fe_3O_4$ nanoparticles;

Step 2: preparation of a rodlike magnetic $Fe_3O_4@SiO_2$ nanoparticle material
(1) Dissolving 4 mg of $Fe_3O_4$ obtained in step 1 in a mixture of 5 mL of deionized water and 25 mL of isopropanol, and sonicating for 30 min to obtain mixed solution B1;
(2) Adding 0.5 mL of ammonia water and 30 μL of tetraethyl orthosilicate (TEOS) into mixed solution B1 to initiate reaction, placing on a tube roller shaker, and reacting for 6 h at room temperature to obtain mixed solution B2; and
(3) After reaction, filtering to obtain filter residues, and washing twice separately with ethanol and deionized water to obtain a rodlike magnetic $Fe_3O_4@SiO_2$ material; storing the magnetic $Fe_3O_4@SiO_2$ material in 30 mL of ethanol for use;

wherein a rodlike structure is formed based on the mechanism that a sub-stable structure formed by self-assembly of magnetic particles is cured to form a permanently fixed structure during $SiO_2$ shell coating.

2. A process for preparing a rodlike magnetic ferroferric oxide ($Fe_3O_4$) material, comprising the following steps:

Step 1: preparation of magnetic $Fe_3O_4$ nanoparticles
(1) Dissolving 0.675 g of $FeCl_3.6H_2O$ in 35 mL of ethylene glycol, and mixing to obtain solution A1;
(2) Adding 1.925 g of $CH_3COONH_4$ in solution A1, and stirring for 30 min to obtain solution A2; and
(3) Charging solution A2 into a reactor, heating to 200° C., heating and reacting for 12 h at a constant temperature, cooling down to room temperature, centrifuging and washing 4-6 times, and drying in air at room temperature to obtain $Fe_3O_4$ nanoparticles;

Step 2: preparation of a rodlike magnetic $Fe_3O_4@SiO_2$ nanoparticle material
(1) Dissolving 4 mg of $Fe_3O_4$ obtained in step 1 in a mixture of 5 mL of deionized water and 25 mL of isopropanol, and sonicating for 30 min to obtain mixed solution B1;
(2) Adding 0.5 mL of ammonia water and 30 μL of tetraethyl orthosilicate (TEOS) into mixed solution B1 to initiate reaction, placing on a tube roller shaker, and reacting for 6 h at room temperature to obtain mixed solution B2; and
(3) After reaction, filtering to obtain filter residues, and washing twice separately with ethanol and deionized water to obtain a rodlike magnetic $Fe_3O_4@SiO_2$ material; storing the magnetic $Fe_3O_4@SiO_2$ material in 30 mL of ethanol for use;

wherein a rodlike structure is formed based on the mechanism that a sub-stable structure formed by self-assembly of magnetic particles is cured to form a permanently fixed structure during $SiO_2$ shell coating; and wherein a diameter of the $Fe_3O_4$ nanoparticle is 200 to 400 nm.

\* \* \* \* \*

UNITED STATES PATENT AND TRADEMARK OFFICE
CERTIFICATE OF CORRECTION

| | | |
|---|---|---|
| PATENT NO. | : 11,512,007 B2 | |
| APPLICATION NO. | : 16/734970 | |
| DATED | : November 29, 2022 | |
| INVENTOR(S) | : Huanhuan Feng et al. | |

It is certified that error appears in the above-identified patent and that said Letters Patent is hereby corrected as shown below:

On the Title Page

APPLICANT(s):
"Harbin Institute Of Technology, Shenzhen,, Shenzhe, CHINA"
Should read:
--Harbin Institute Of Technology, Shenzhen, Shenzhen, CHINA--

Signed and Sealed this
Eighth Day of August, 2023

Katherine Kelly Vidal
*Director of the United States Patent and Trademark Office*